(12) United States Patent
Maeda et al.

(10) Patent No.: US 7,021,812 B2
(45) Date of Patent: Apr. 4, 2006

(54) LIGHTING DEVICE AND LIQUID CRYSTAL DISPLAY DEVICE

(75) Inventors: Satoshi Maeda, Kawasaki (JP); Hirokazu Aritake, Kawasaki (JP); Chikara Nishio, Kawasaki (JP); Takao Satake, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/733,052

(22) Filed: Dec. 11, 2003

(65) Prior Publication Data

US 2004/0119910 A1 Jun. 24, 2004

Related U.S. Application Data

(63) Continuation of application No. PCT/JP02/00718, filed on Jan. 30, 2002.

(30) Foreign Application Priority Data

Jun. 18, 2001 (JP) .............................. 2001-183886

(51) Int. Cl.
*F21V 7/04* (2006.01)

(52) U.S. Cl. ..................... 362/608; 362/19; 362/610; 362/612; 362/622; 359/496

(58) Field of Classification Search ............ 362/26–27, 362/31, 561, 19, 147, 801, 608, 610, 612, 362/622, 624, 626; 385/147, 901; 359/496
See application file for complete search history.

(56) References Cited

U.S. PATENT DOCUMENTS

| 5,712,694 A | * | 1/1998 | Taira et al. ..................... 349/9 |
| 6,086,212 A | * | 7/2000 | Onishi et al. ................ 362/621 |
| 6,147,725 A | | 11/2000 | Yuuki et al. ................... 349/65 |
| 6,163,351 A | | 12/2000 | Nakayama ................... 349/61 |
| 6,283,602 B1 | | 9/2001 | Kawaguchi et al. |
| 6,636,283 B1 | * | 10/2003 | Sasagawa et al. ............ 349/65 |

FOREIGN PATENT DOCUMENTS

| EP | 0 866 264 A1 | | 9/1998 |
| JP | 06-160840 | * | 6/1994 |
| JP | 06-202107 | * | 7/1994 |

(Continued)

*Primary Examiner*—Stephen Husar
*Assistant Examiner*—Jason Han
(74) *Attorney, Agent, or Firm*—Greer, Burns & Crain, Ltd.

(57) ABSTRACT

A lighting device including a light guide plate, a light source unit disposed on the side of the light guide plate and a polarization separation element disposed between the light guide plate and the light source unit. The polarization separation element is used for transmitting linearly polarized light in a first polarized direction and reflecting linearly polarized light in a polarized direction normal to the first polarized direction. The light source unit includes a pillar-shaped light guide which light exits at a first side surface, a spot light emission source disposed on the end surface of the pillar-shaped light guide, and a reflecting layer disposed on a second side surface of a prism surface opposed to the first side surface for reflecting light from the spot light emission source.

9 Claims, 14 Drawing Sheets

FOREIGN PATENT DOCUMENTS

| | | |
|---|---|---|
| JP | 9-073083 | 3/1997 |
| JP | 9-105929 | 4/1997 |
| JP | 9-326205 | 12/1997 |
| JP | 10-170916 | 6/1998 |
| JP | 10-260405 | 9/1998 |
| JP | 11-258600 | 9/1999 |
| JP | 2000-292786 | * 10/2000 |
| JP | 2000292786 A | * 10/2000 |

* cited by examiner

LIGHTING DEVICE AND LIQUID CRYSTAL DISPLAY DEVICE

CROSS REFERENCE TO RELATED APPLICATION

This application is a Continuation of PCT application No. PCT/JP02/00718, which was filed on Jan. 30, 2002, and which designated the United States.

TECHNICAL FIELD

The present invention relates to a lighting device for applying light to a liquid crystal panel, and a liquid crystal display device using the lighting device.

BACKGROUND ART

Liquid crystal display devices are widely used as displays of portable information terminals because of their thinness and lightness and also because of their small electric power consumption. The liquid crystal display devices require lighting devices because the liquid crystal panels, which are constituent members of the liquid crystal display devices, are not spontaneous luminous elements. The lighting devices are classified in the so-called back light type, in which light is provided on the back surface of a liquid crystal panel, i.e., on the opposite side of a viewer and the so-called front light type, in which light is provided on the front surface of a liquid crystal panel, i.e., on the side of a viewer. The back light is used in the transmittal liquid crystal panels, and the front light is used in the reflective liquid crystal panels. The reflective liquid crystal panels basically require no lighting device, but recently many of the reflective liquid crystal panels have front panels on the front side because the reflective liquid crystal panels are difficult to view in circumstances of little light.

In the liquid crystal display devices used in portable information terminals, the lighting devices must be thin as well, and to this end, the so-called side light (also called the edge light) lighting device, in which a linear light source, such as a cold cathode tube or others, is disposed together with a reflector (a reflecting plate) on the side of a flat light guide plate of a transparent material, is used. In the lighting device of such side light-type, light emitted from a linear light source is incident on the side surface of the light guide plate directly or indirectly after reflected on the reflector. The light which has entered the light guide plate exits from the upper side of the flat light guide plate in the back light while propagating in the light guide plate to enter the liquid crystal panel disposed on the side of the upper surface of the light guide plate, which is the lighting means. In the front light, the light exits from the lower surface of the flat light guide plate to enter the liquid crystal panel disposed on the side of the lower surface of the light guide plate, which is the lighting means.

The light emitted from a light source, such as a cold cathode tube or others, is usually random polarized light, i.e., non-polarized light, and the light exiting the light guide plate is also random polarized light. The liquid crystal panel usually has a polarizer on the incidence side alone, or on the incidence side and the exit side so that prescribed linear polarized light alone enters the liquid crystal panel. That portion of the random polarized light exiting the light guide plate and entering the liquid crystal panel, which actually enters the liquid crystal panel and is used for display is substantially a half of the random polarized light. The utilization efficiency of the light is low. Higher luminance is required for the displays of the portable information terminals.

Higher luminance of this prior art structure can be provided by increasing the light emission amount of the light source, such as a cold cathode tube or others. However, this unsuitably increases the electric power consumption, especially for the displays of portable information terminals, etc. driven by batteries.

As means for solving this problem, light exiting the light guide plate and entering the liquid crystal panel is formed into linearly polarized light, whereby substantially all the light exiting the lighting device is incident on the liquid crystal panel to be used.

For example, the specification of Japanese Patent Application Unexamined Publication No. Hei 09-73083 (1997) discloses the side light-type lighting device in which a sub-light guide plate, polarization separation means of a cholesteric liquid crystal sheet and phase transforming means of polyvinyl alcohol (PVA) are arranged between a light source and a light guide plate in the stated order from the light source. In this prior art, the polarization separation means of a cholesteric liquid crystal sheet transmits first circularly polarized light and reflects second circularly polarized light, and the phase transforming means transforms the first circularly polarized light into linearly polarized light to make the linearly polarized light incident on the light guide plate. To keep the polarization separation means from being affected by the incident angle dependency, the sub-light guide plate is provided to make light enter the polarization separation means at the same angle. On the other hand, the reflected second circularly polarized light returns to the side of the light source, is reflected on the surface of the light source, a reflector or others to be circularly polarized light having the polarity reversed, i.e., the first circularly polarized light and is transmitted by the polarization separation means.

Accordingly, in the prior art lighting device, more than half of the light from the light source can be introduced into the light guide plate to be used.

However, the above-described prior art lighting device requires the assistant member, such as a sub-light guide plate which controls the incident angle of light on the polarization separation means to keep the polarization separation means, for separating the circularly polarized light from being affected by the incident angle dependency. The above-described reference discloses the structure which does not include such assistant member (the sub-light guide plate), but practically, without the assistant member, the desired effect of improving the utilization efficiency of the light source light cannot be obtained.

The above-described prior art has disadvantages that the lighting device has a large number of members, and accordingly cannot realize smaller sizes and reduced weights and cannot be fabricated at low costs.

In view of the above-described problem, the present invention aims at providing a lighting device having high efficiency of utilizing light source light and including a smaller number of members, and a liquid crystal display device having improved brightness (luminance).

DISCLOSURE OF INVENTION

FIG. 1 is a view explaining the principle of the present invention. Light L1 emitted from a light source unit 2 is non-polarized light. The light L1 passes through a phase modulation element 4 to be non-polarized light L2 and is incident on a polarization separation element 6 which transmits light in a first polarization direction and reflects light in a second polarization direction normal to the first polarization direction. The polarization separation element 6 transmits the first linearly polarized light L3 and reflects the second polarized light L4 whose polarization direction is normal to the linearly polarized light L3. The linearly polarized light L3 propagates to a light guide plate not shown. The linearly polarized light L4 is incident on the phase modulation element 4 to be transformed into circularly polarized light L5, and the circularly polarized light L5 returns to the light source unit 2.

The light L5 which has returned to the light source unit 2 repeats reflections, etc. inside the light source unit 2 to be again non-polarized light L1 and is emitted from the light source unit 2. Then, as described above, a half of the non-polarized light L1, i.e., first linearly polarized light L3 is transmitted by the polarization separation element 6 and propagates to the light guide plate, and the rest light, i.e., the second linearly polarized light returns again to the light source unit 2. The repetition of this process makes most of the light emitted from the light source unit 2 incident on the light guide plate to be utilized.

When the circularly polarized light L5 is reflected once on the light source unit 2 and exits the light source unit 2, the circularly polarized light L5 is reversed and transformed by the phase transforming element 4 into the first linearly polarized light, which is linearly polarized light, and passes as it is through the polarization separation element 6.

In the above-described description, the phase modulation element 4 is disposed between the light source unit 2 and the polarization separation element 6 but can be omitted.

The above-described disadvantages can be solved by a lighting device which is characterized by the light guide plate in the shape of a flat plate, the light source unit disposed on the side of the light guide plate, and the polarization separation element disposed between the light guide plate and the light source unit, for transmitting the linearly polarized light in a first polarization direction and reflecting the linearly polarized light whose polarization direction is normal to the first polarization direction, and a liquid crystal display device including the lighting device.

BEST MODE FOR CARRYING OUT THE INVENTION

Embodiments of the present invention will be explained with reference to the drawings. The members having the same functions are represented by the same reference numbers not to repeat their explanation.

A FIRST EMBODIMENT

Figure 1:
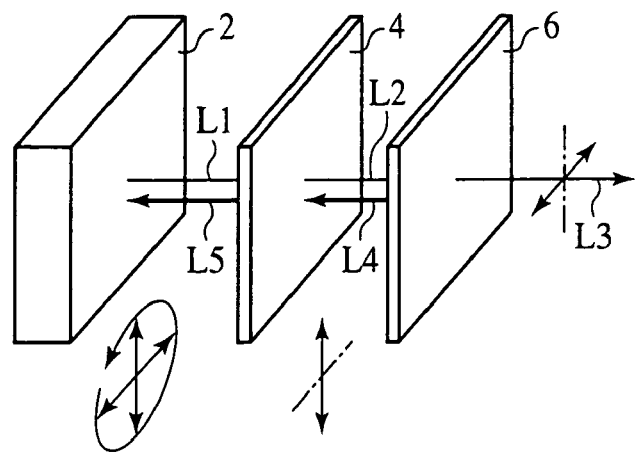
FIG. 1 is a view explaining the principle of the present invention.
Figure 2:
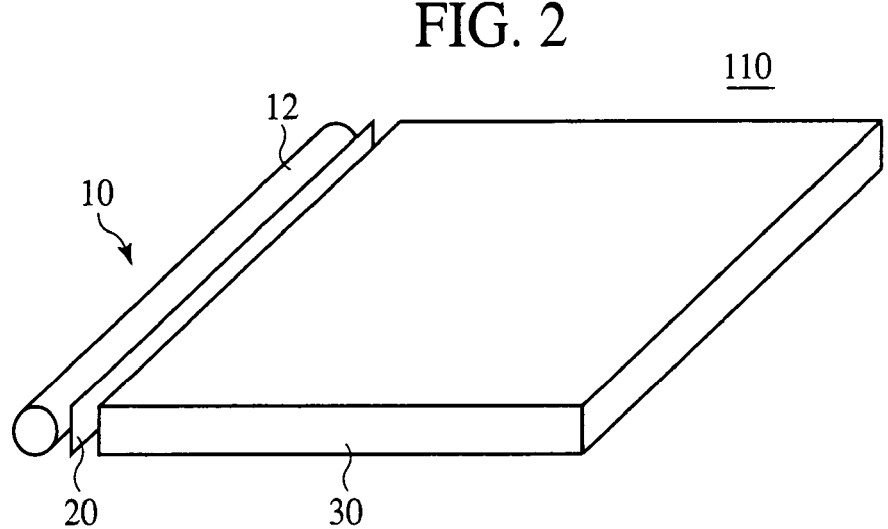
FIG. 2 is a view of a first embodiment of the present invention.
Figure 12A:
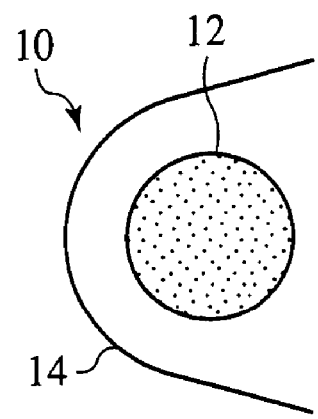
FIG. 12 is views of the light source unit including a cold cathode tube.

FIG. 2 is a view of the lighting device 110 according to a first embodiment of the present invention. The lighting device 110 is of the front light-type and comprises a light guide plate 30 in the shape of a flat plate, and a polarization separation sheet 20 as the polarization separation element and a linear light source unit 10 which are disposed on the side of one side surface of the light guide plate 30. The polarization separation sheet 20 is disposed between the light source unit 10 and the light guide plate 30. The linear light source unit 10 which emits linear light comprises, as exemplified in FIG. 12A, a cold cathode tube 12, which is a linear emission source, and a reflector 14 which is a reflecting member. The reflector 14 is formed of, e.g., aluminum and surrounds the cold cathode tube 12 with the light emitting side opened. In FIG. 1 and the following drawings, the light source unit 10 is represented by the cold cathode tube 12 alone to simplify the drawings.

Figure 12B:
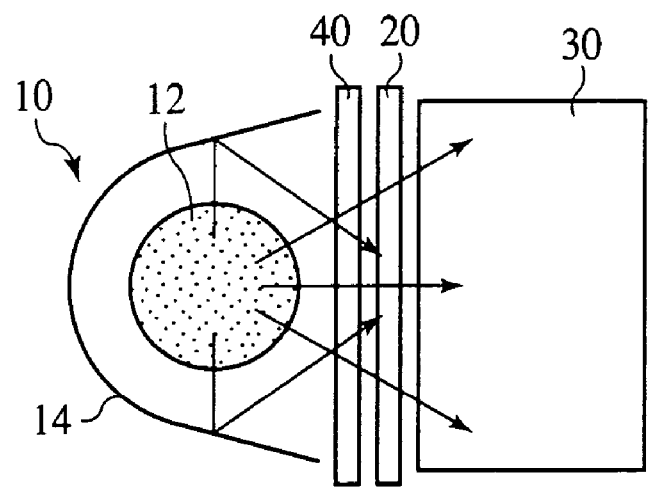

Light from the cold cathode tube 12 is generally non-polarized light, and the light reflected on the reflector 14 is also non-polarized. As shown in FIG. 12B, the light emitted from the cold cathode tube 12 exits the light source unit 10 and is incident on the polarization separation sheet 20, directly or after being reflected on the reflector 14. FIG. 12B shows a phase modulation element (a ¼ wavelength sheet 40) which will be described later.

The polarization separation sheet 20 can be a sheet available on the market, e.g., D-BEF (trade name) by 3M Co., Inc. The polarization separation sheet 20 transmits linearly polarized light of the light incident thereon, which has a prescribed polarization direction and reflects linearly polarized light of the light incident thereon, whose polarization direction is normal to the prescribed polarization direction. The prescribed polarization direction, i.e., the polarization direction of the transmitted linearly polarized light, is determined by a direction of the arrangement of the optical axis of the polarization separation sheet. The other linearly polarized light reflected on the polarization separation sheet 20 returns to the light source unit 10. Part of the light propagates to the cold cathode tube 12, and the rest of the light propagates to the reflector 14. The light incident on the cold cathode tube 12 is used in the secondary emission of the phosphor of the cold cathode tube 12 to be again non-polarized light and is incident on the polarization separation sheet 20. That of the light, which has been linearly polarized in the prescribed direction passes through the polarization separation sheet 20, and the reset of the light, whose polarization direction is normal to the prescribed polarization direction, returns again to the light source unit 10.

This process is repeated, whereby almost all the light is passed through the polarization separation sheet 20 and propagates to the light guide plate 30. Here, "almost all" means that actually, this process cannot be repeated infinite times because of losses in the interfaces, losses upon the reflections, losses upon the secondary emission, etc.

The linearly polarized light which has passed through the polarization separation sheet 20 is incident on the light guide plate 30. The light guide plate 30 is for the front light-type lighting device. As exemplified in FIG. 18, the light guide plate 30 has an upper side, i.e., the viewing side of the reflection-type liquid crystal panel including the light guide plate 30 formed in a prism surface of two kinds of slant surfaces 32, 34 having inclination angles different from each other, and has an underside surface, i.e., the side of the reflection-type liquid crystal panel including the light guide plate 30 formed in a flat surface 36.

Figure 18A:
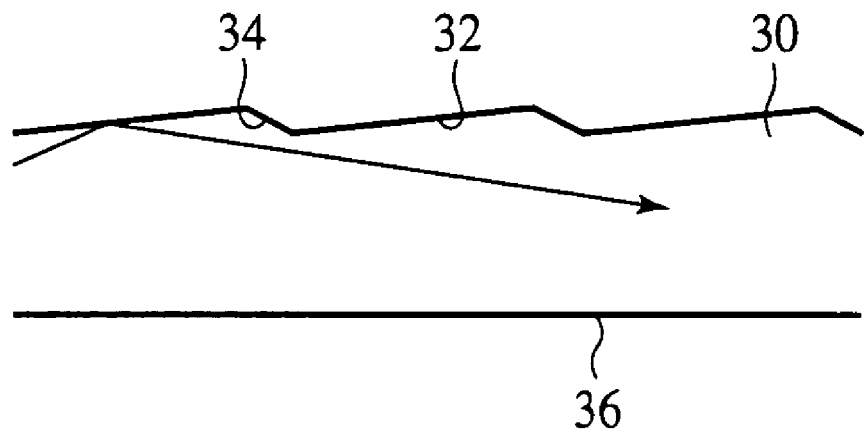
FIG. 18 is views explaining the light in the light guide.
Figure 18B:
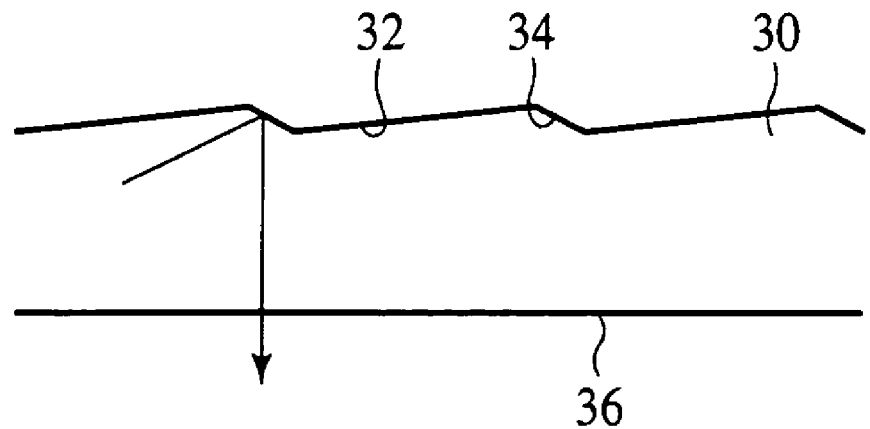

When the light is incident from the left in FIG. 18, that portion of the light incident on the light guide plate 30, which is incident on the slant surface 32 of the smaller inclination angle propagates through the light guide plate, making total reflections, and that portion of the light incident on the light guide plate 30, which is incident on the slant surface 34 of the larger inclination angle is reflected to exit outside at the underside 36. When the light incident on the light guide plate 30 is linearly polarized, the light is retained linearly polarized in the light guide plate 30, and exits the light guide plate 30, similarly linearly polarized.

Thus, as in the first embodiment described above, simply disposing the polarization separation element between the light source unit and the light guide plate makes it possible to re-use the reflected light in the polarization separation element to make incident on the light guide plate, linearly polarized, whereby the lighting device can be fabricated with a small number of members but can have high efficiency of utilizing light.

A SECOND EMBODIMENT

Figure 3:
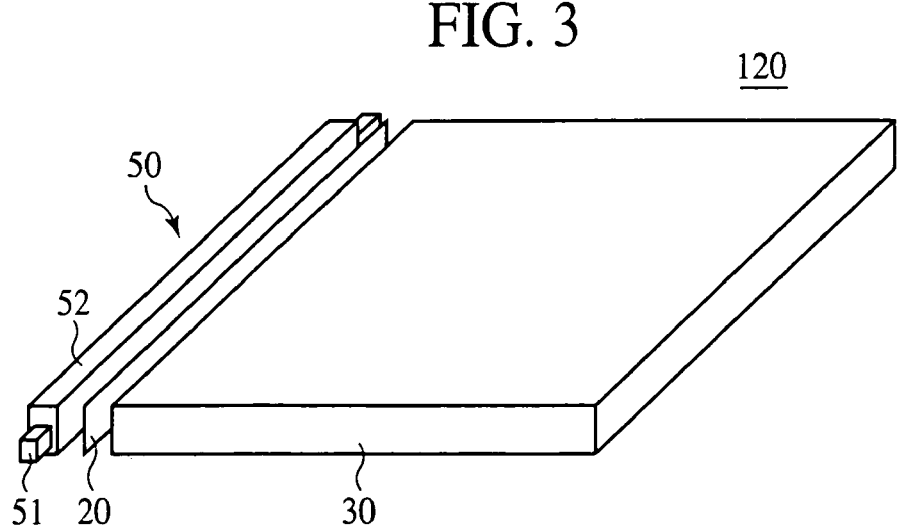
FIG. 3 is a view of a second embodiment of the present invention.

FIG. 3 is a view of the lighting device according to a second embodiment of the present invention. The lighting device according to the second embodiment has the same structure as the lighting device according to the first embodiment except the light source unit 50.

Figure 13A:
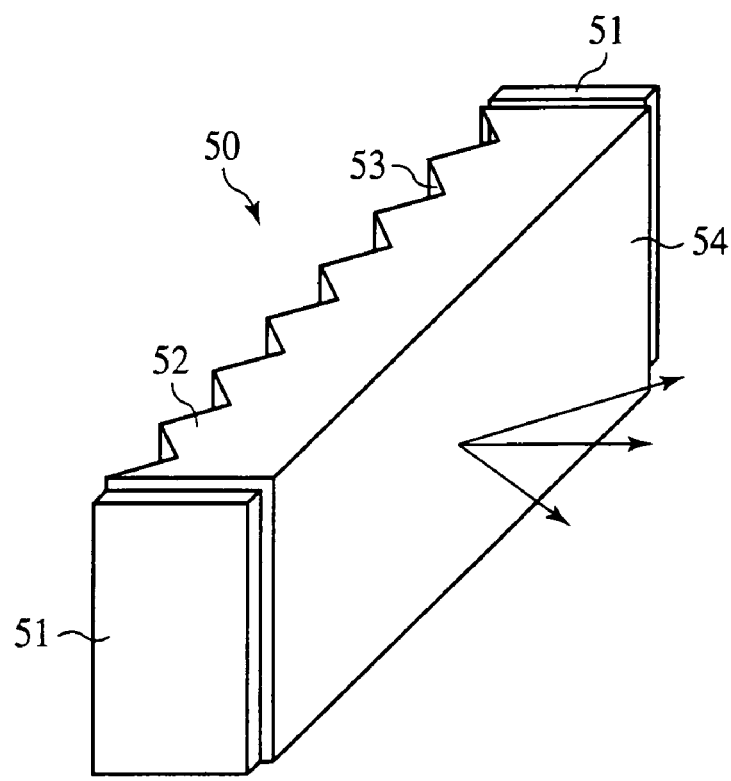
FIG. 13 is views of the light source unit including an LED.

The structure of the light source unit 50 is detailed in FIG. 13. As shown FIG. 13A, the light source unit 50 comprises a pillar-shaped light guide 52 formed of a transparent member of a substantially square pole, and spotlight emitting portions 51 which emit spot light disposed on both ends of the pillar-shaped light guide 52. The spot emitting portions 51 comprise, e.g., LEDs (Light Emitting Diodes), which are inexpensively available. One of the four side surfaces of the pillar-shaped light guide 52 is a flat light emitting surface 54, and the side surface opposed to the light emitting surface 54 is a prism surface 53. The other two side surfaces are flat.

Figure 14A:
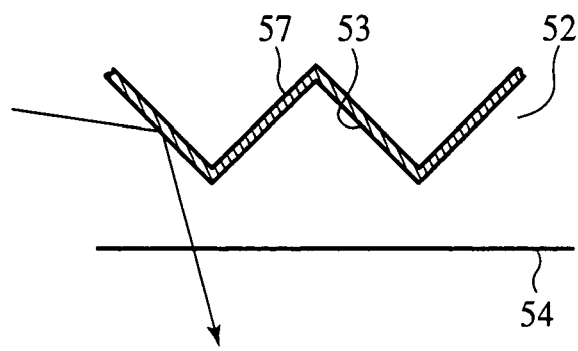
FIG. 14 is views explaining the light in the pillar-shaped light guide.
Figure 14B:
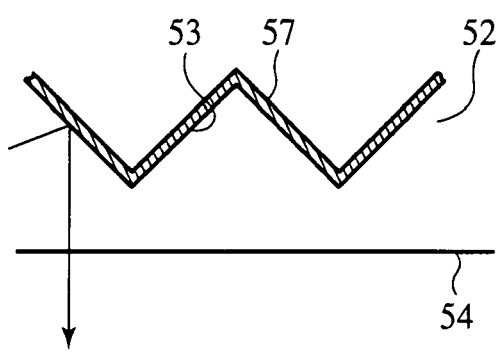
Figure 14C:
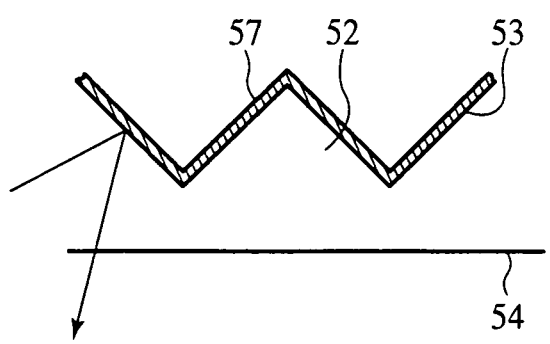

As shown in FIG. 14, a reflection layer 57 of a metal film or a multi-layer film or others as the reflecting member is provided on the prism surface 53. Therefore, the light incident on the pillar-shaped light guide 52 from the spot light emitting portions 51 is reflected on the reflecting layer 57 provided on the prism surface 53 irrespective of incident angles to the prism surface 53 as shown in FIGS. 14A to 14C. Accordingly, the light exits at the exit surface 54 without becoming ineffective and propagates to the polarization separation sheet 20. Light emitted by the LEDs of the spot light emitting portions 51 is generally non-polarized light, and the light exiting the pillar-shaped light guide 52 is also non-polarized.

Figure 16A:
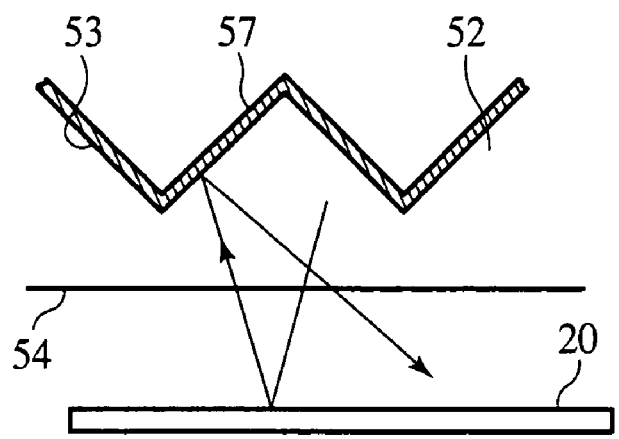
FIG. 16 is views explaining the reflected light on the polarization separation sheet.

Of non-polarized light exiting the pillar-shaped light guide 52, light alone which has been linearly polarized in a prescribed direction by the polarization separation sheet 20 is passed, and as shown in FIG. 16, light linearly polarized in a direction normal to the prescribed direction returns to the pillar-shaped light guide 52. The light which has returned to the pillar-shaped light guide 52 is incident on the prism surface 53. As shown in FIG. 16A, part of the light is reflected on the reflector 57 to be transformed into non-polarized light and exits again from the exit surface 54 to be incident on the polarization separation sheet 20. The polarization separation sheet 20 transmits light linearly polarized in the prescribed direction, reflecting the light linearly polarized in the direction normal to the prescribed direction. This process is repeated.

Figure 16B:
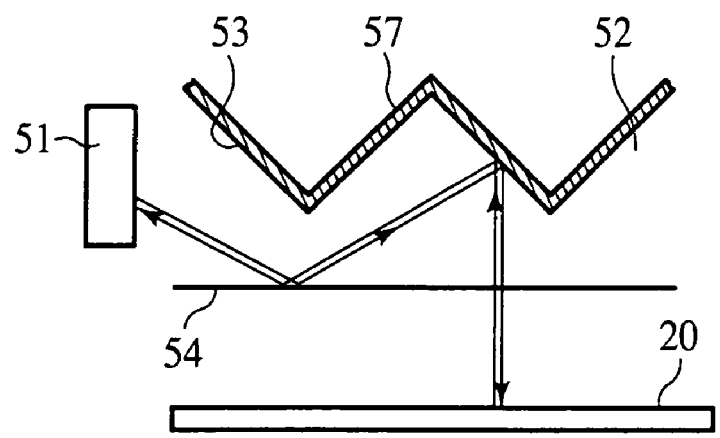

Part of the light which has returned to the pillar-shaped light guide 52, as shown in FIG. 16B, is reflected on the reflecting layer 57 and is further totally reflected on the exit surface 54 to propagate in the pillar-shaped light guide 52 and enters the spot light emitting portion 51. The light is transformed into non-polarized light by the secondary emission and propagates in the pillar-shaped light guide 52 to exit again at the exit surface 54 to enter the polarization separation sheet 20. Then, the polarization separation sheet 20 transmits prescribed linearly polarized light alone and reflects light linearly polarized normal to the prescribed linearly polarized light. This process is repeated.

As described above, in the light source unit 50 of the present embodiment, almost all the light emitted by the spot light emitting portions 51 passes through the pillar-shaped light guide 52 and the polarization separation sheet 20 to be transformed into linearly polarized light and is incident on the light guide plate 30. The light incident on the light guide 30 exits the light guide 30, retaining linearly polarized as it is. Thus, the lighting device 120 according to the present embodiment has the same function and advantageous effect as the lighting device according to the first embodiment described above.

Figure 13B:
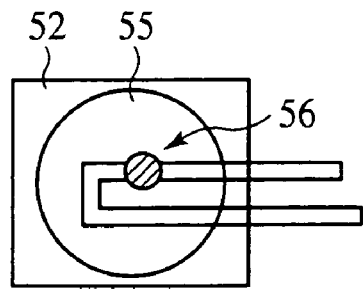
Figure 13C:
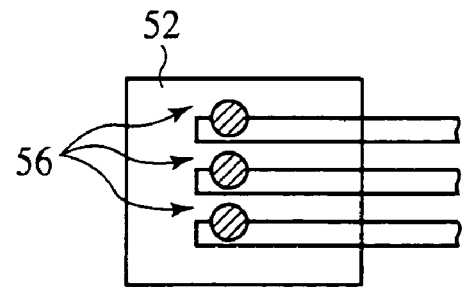

The spot light emitting portions 51 can have different structures. For example, as shown in FIG. 13B, it is possible that a phosphor 55 is applied to the end surfaces of the pillar-shaped light guide 52, and a spot light source, such as LED 56 or others, is arranged on the phosphor. As shown in FIG. 13C, it is also possible that spot light sources, such as a plurality of LEDs 56 or others, are arranged on one end surface of the pillar light guide 52. In the structure of FIG. 13C, the plurality of spot light sources may have the same wavelength or wavelengths different from each other.

The pillar-shaped light guide 52 is not essentially square pole-shaped and can be polygonal pole-shaped. In this case, at least one side surface can be the exit plane, and the reflecting member or the prism surface can be provided on at least another side surface or on both side surfaces.

A THIRD EMBODIMENT

Figure 4:
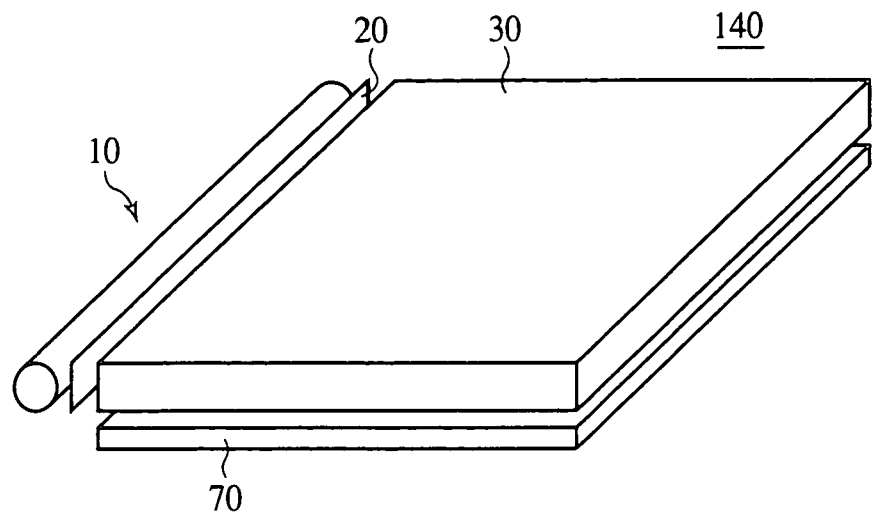
FIG. 4 is a view of a third embodiment of the present invention.

FIG. 4 is a view of the liquid crystal display device 140 according to a third embodiment of the present invention. The liquid crystal display device 140 is of the reflection-type and comprises a reflection-type liquid crystal panel 70, and the front light-type lighting device 110 according to the first embodiment described above disposed on the front side of the reflection-type liquid crystal panel 70 and including the light source unit 10, the polarization separation sheet 20 and the light guide plate 30. The lighting device 110 applies light to the front surface of the liquid crystal panel 70 and the light reflected on the liquid crystal panel 70 passes through the light guide 30 of the lighting device 110. Resultantly, displays on the liquid crystal panel 70 are viewed via the light guide panel 30.

A polarizer is disposed on the side of the front surface (incidence side) of the liquid crystal panel 70. The polarization axis of the polarizer is extended in the longitudinal direction of the liquid crystal panel 70, i.e., the longitudinal direction of the linear light source unit 10. Accordingly, a polarization direction of the linearly polarized light exiting the light guide plate 30 and incident on the liquid crystal panel 70, and the transmission axis of the polarizer must be agreed with each other.

Figure 21:
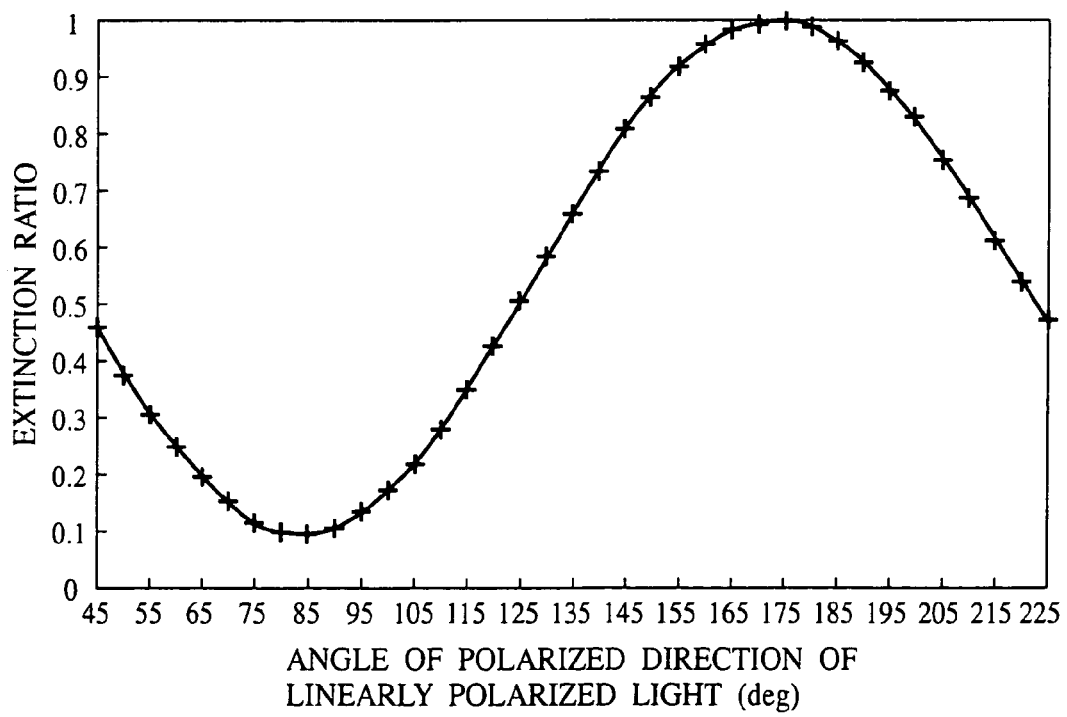
FIG. 21 is a graph of relationships between polarized directions of the linearly polarized light and angles of the optical axis of the polarizer.

FIG. 21 is a graph of relationships between polarized directions of the linear polarization and angles of the optical axis of the polarizer. Angles of polarized directions of linearly polarized light incident on the polarizer are taken on the horizontal axis. The direction at 90 degrees corresponds to the shielding axis of the polarizer, and the direction at 180 degrees, i.e., the longitudinal direction of the liquid crystal panel (the longitudinal direction of the linear light source unit) in the present embodiment corresponds to the transmission axis of the polarizer. On the vertical axis are taken extinction ratios, which are ratios of transmitted light quantities of exiting light (transmitted light and reflected light) from the liquid crystal panel to the maximum transmitted light quantity. Based on the graph, it is seen that when a polarized direction of the linearly polarized light agrees substantially with the transmission axis of the polarizer, the transmitted light quantity is maximum. In other words, when a polarized direction of the linearly polarized light disagrees with the transmission axis of the polarizer, losses due to the absorption in the polarizer take place.

Accordingly, in the present embodiment, polarized directions of linearly polarized light passing through the polarization separation sheet 20 are adjusted to thereby substantially agree polarized directions of light exiting the light guide plate 30 with the transmission axis of the polarizer on the front surface of the liquid crystal panel 70. That is, when the polarization separation sheet 20 is cut out from a large sheet, the polarization separation sheet 20 is cut so that light passing through the polarization separation sheet 20 is polarized in a prescribed direction, i.e., the longitudinal direction of the polarization separation sheet 20 is substantially in parallel with the polarized direction of the transmitted light. The prescribed direction means here a direction in which when the linearly polarized light which has passed through the polarization separation sheet 20 passes through the light guide plate 30 and is incident on the polarizer of the liquid crystal panel 70, the polarized direction of the linearly polarized light agrees substantially with the transmission axis of the polarizer.

Figure 22:
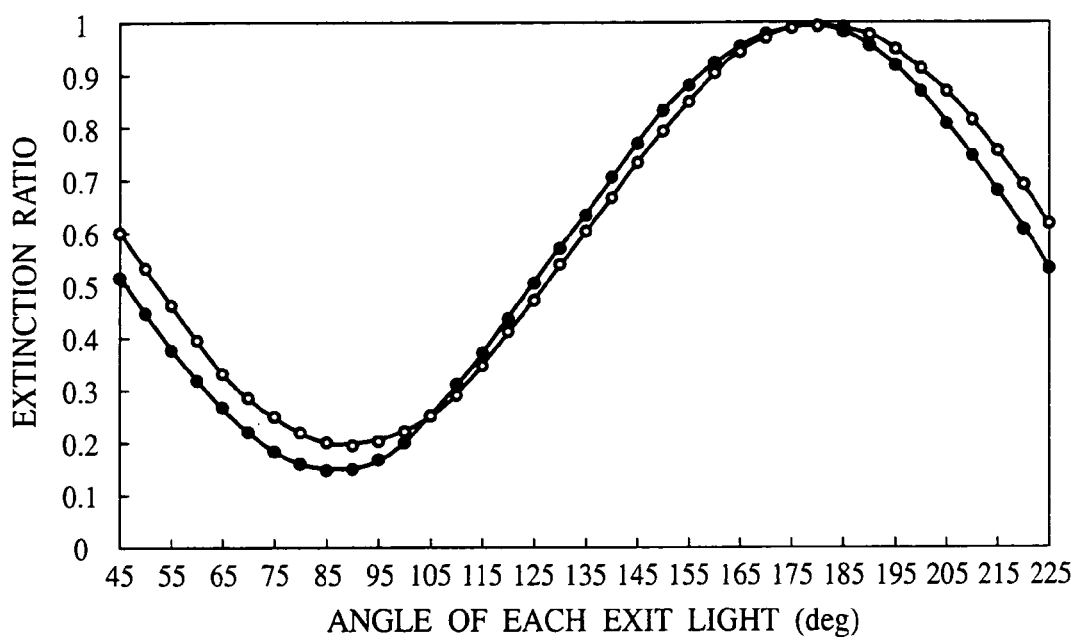
FIG. 22 is a graph of relationships between the exit light of the polarization separation element and polarized directions of the exit light of the light guide plate.

FIG. 22 is a graph of polarized directions of exiting light of the polarization separation element (polarization separation sheet 20) and exiting light of the light guide plate (light guide plate 30). Angles of the exiting light are taken on the horizontal axis, and the angles are with respect to the transmission axis of the polarizer. The positional direction of the transmission axis of the polarizer is as described above. On the vertical axis are taken extinction ratios, which are ratios of transmitted light quantities of exiting light (transmitted light and reflected light) of the liquid crystal panel (the liquid crystal panel 70) to the maximum transmitted light quantity. Based on the graph, in the present embodiment, the polarization characteristics of the exiting light of the polarization separation sheet 20 agree substantially with the polarization characteristics of the exiting light of the light guide plate 30. That is, it can be seen that polarized states of the linearly polarized light which has entered the light guide plate 30 are retained.

As described above, the liquid crystal display device 140 according to the present embodiment uses the lighting device 110 whose light utilization efficiency is high, and furthermore, has the light transmission axis of the polarization separation sheet 20 and the transmission axis of the polarizer of the liquid crystal panel 70 which are set so that light from the lighting device 110 can be incident on the liquid crystal panel 70 efficiently without losses, whereby the liquid crystal display device can be bright.

In the present embodiment, as the lighting device, the lighting device according to the second embodiment described above, may be used. The reflection-type liquid crystal panel 70 can be a TN (Twisted Nematic) mode liquid crystal panel, a VA (Vertically Aligned) mode liquid crystal panel or others, i.e., any of the reflection-type liquid crystal panels of various modes.

A FOURTH EMBODIMENT

Figure 5:
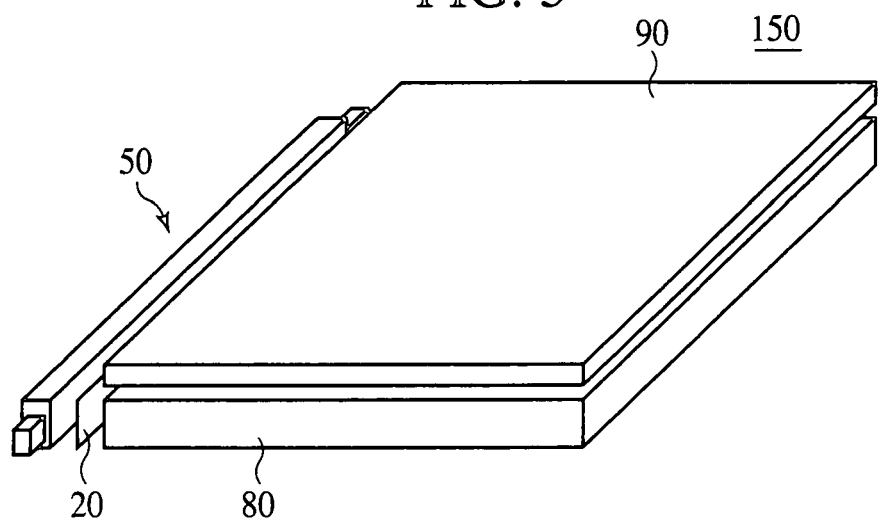
FIG. 5 is a view of a fourth embodiment of the present invention.

FIG. 5 is a view of the liquid crystal display device 150 according to a fourth embodiment of the present invention. The liquid crystal display device 150 is of the transmission-type liquid crystal display device and comprises a transmission-type liquid crystal panel 80, and the lighting device according to the second embodiment described above, which is of the back light-type disposed on the back side of the transmission-type liquid crystal panel 90. The back light-type lighting device according to the present embodiment is the same as the lighting device 120 according to the second embodiment with respect to the light source unit 50 and the polarization separation sheet 20 but is different from the latter with respect to the light guide plate 80.

The light guide plate 80 has a diffusion pattern for diffusing toward the upper surface (the front surface) light incident on the back surface, and a reflecting plate disposed on the side of the back surface. The upper surface of the light guide plate 80 is the exit surface where light exits, and the light which has exited the light guide 80 enters the transmission-type liquid crystal panel 90 at the back side thereof.

Accordingly, displays on the liquid crystal panel 90 are viewed directly from the front surface of the liquid crystal panel 90. The function of the light guide plate 80 is the same as that of the light guide plate 30 of the above-described embodiments. Light which has been linearly polarized by the light source unit 50 and the polarization separation sheet 20 is incident on the light guide plate 80 and exits the light guide plate 80 retaining its polarization state.

As in the embodiment described above, a polarizer is provided on the incidence side (on the side of the back surface) of the liquid crystal panel 90. In the present embodiment as well, the positional directions of the polarization separation sheet 20 and the polarizer on the side of the incidence of the liquid crystal panel 90 are determined so that when linearly polarized light which has passed through the polarization separation sheet 20 and enters the polarizer of the liquid crystal panel 90, the polarized direction of the linearly polarized light substantially agrees with the transmission axis of the polarizer.

As described above, the liquid crystal display device 150 according to the present embodiment uses the lighting device whose light utilization efficiency is high, as does the liquid crystal display device 140 described above, and furthermore, has the light transmission axis of the polarization separation sheet 20 and the transmission axis of the polarizer of the liquid crystal panel 90 which are set so that light from the lighting device can be incident on the liquid crystal panel 90 efficiently without losses, whereby the liquid crystal display device can be bright.

In the present embodiment as well, the lighting device 110 according to the first embodiment described above can be used as the lighting device which is of the back light-type. The transmission-type liquid crystal panel 90 can be any of transmission-type liquid crystal panel of various modes as in the embodiment described above.

A FIFTH EMBODIMENT

Figure 6:
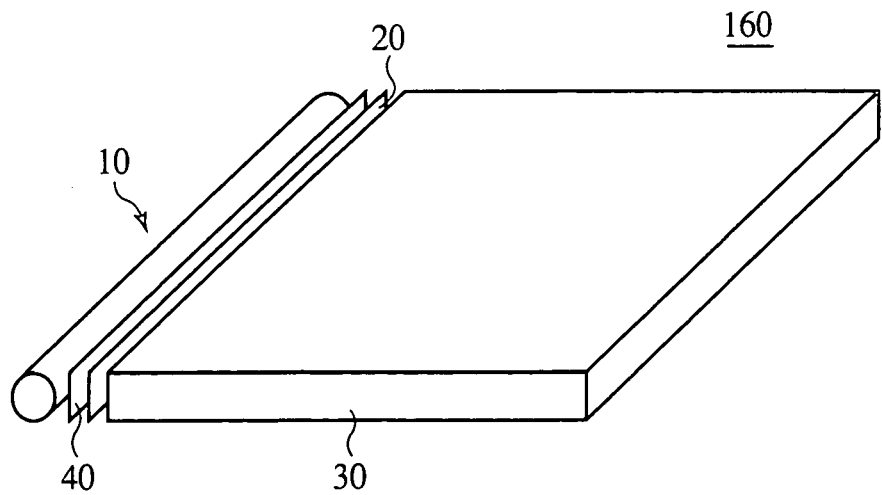
FIG. 6 is a view of a fifth embodiment of the present invention.

FIG. 6 is a view of the lighting device 160 according to a fifth embodiment of the present invention. The lighting device 160 is of the front light-type and has a structure similar to that of the lighting device 110 according to the first embodiment described above but is different from the latter in that a ¼ wavelength sheet 40 as a phase modulation element is disposed between the light source unit 10 and the polarization separation sheet 20.

In the present embodiment, as shown in FIG. 12B, non-polarized light emitted by the cold cathode tube 12 exits the light source unit 10 directly (or is reflected by the reflector 14), enters and passes through the ¼ wavelength sheet 40 and is incident on the polarization separation sheet 20. The polarization separation sheet 20 can be a commercially available sheet, e.g., D-BEF (trade name) by 3M Co., Inc.

Of the light entering the polarization separation sheet 20, light linearly polarized in a prescribed direction is transmitted, and light linearly polarized normally to the prescribed direction is reflected. The prescribed direction, i.e., the polarized direction of the transmitted linearly polarized light is determined by the positional direction of the optical axis of the polarization separation sheet. The linearly polarized light reflected on the polarization separation sheet 20 is incident on the ¼ wavelength sheet 40 to be transformed into circularly polarized light and return to the light source unit 10. Part of the circularly polarized light which has returned to the light source unit 10 propagates to the cold cathode tube 12, and the rest of the circularly polarized light propagates to the reflector 14.

The circularly polarized light which has been incident on the cold cathode tube 12 is used for the secondary emission by the phosphor of the cold cathode tube 12 and exits the light source unit 10 again in non-polarized light. The non-polarized light which has exited the light source unit 10 passes through the ¼ wavelength sheet 40, is incident on the polarization separation sheet 20. Only that portion of the light, which has been linearly polarized in the prescribed direction is transmitted, and the rest of the light, which has been linearly polarized normally to the prescribed direction is reflected and again returns to the light source unit 10.

The circularly polarized light incident on the reflector 14 is reflected on the reflector 14 to be reversed circularly polarized light and exits the light source unit 10, keeping this state. The reversed circularly polarized light is incident on the ¼ wavelength sheet 40 and transformed into linearly polarized light. The polarized direction of the transformed linearly polarized light is normal to a polarized direction of the linearly polarized light which has been reflected on the polarization separation sheet 20 and returned. That is, the transformed linearly polarized light is the linearly polarized light which can be transmitted by the polarization separation sheet 20. Accordingly, the linearly polarized light transformed by the ¼ wavelength sheet 40 passes through the polarization separation sheet 20 and toward the light guide plate 30.

This process is repeated, whereby almost all the light exiting the light source unit 10 passes through the polarization separation sheet 20 and toward the light guide plate 30. Here, "almost all" means that actually, this process cannot be repeated infinite times because of losses in the interfaces, losses upon the reflections, losses upon the secondary emission, etc.

In the present embodiment, however, because of the phase modulation element (the ¼ wavelength sheet 40) disposed between the light source unit and the polarization separation element (the polarization separation sheet 20), that of the linearly polarized light which has been reflected on the polarization separation element and returned, which is transformed into circularly polarized light by the phase modulation element, reflected on the reflector of the light source unit and is incident again on the phase modulation element is transformed into linearly polarized light which is transmitted by the polarization separation element. Thus, the linearly polarized light which has been reflected on the polarization separation element and returned can propagate to the light guide plate by returning only once to the light source. The linearly polarized light which has been reflected on the polarization separation element and returned does not have to repeat several times the reflection on and the transmission of the respective elements, and the secondary emission, which lessens losses due to the reflection on and the transmission of the respective elements, and the secondary emission, which leads to higher efficiency of utilizing light.

Accordingly, in comparison with the first to the third embodiments described above, the present embodiment including the phase modulation element disposed between the light source unit and the polarization separation element can have higher light utilization efficiency, and, in combination with liquid crystal panels, can realize brighter liquid crystal panels.

A SIXTH EMBODIMENT

Figure 7:
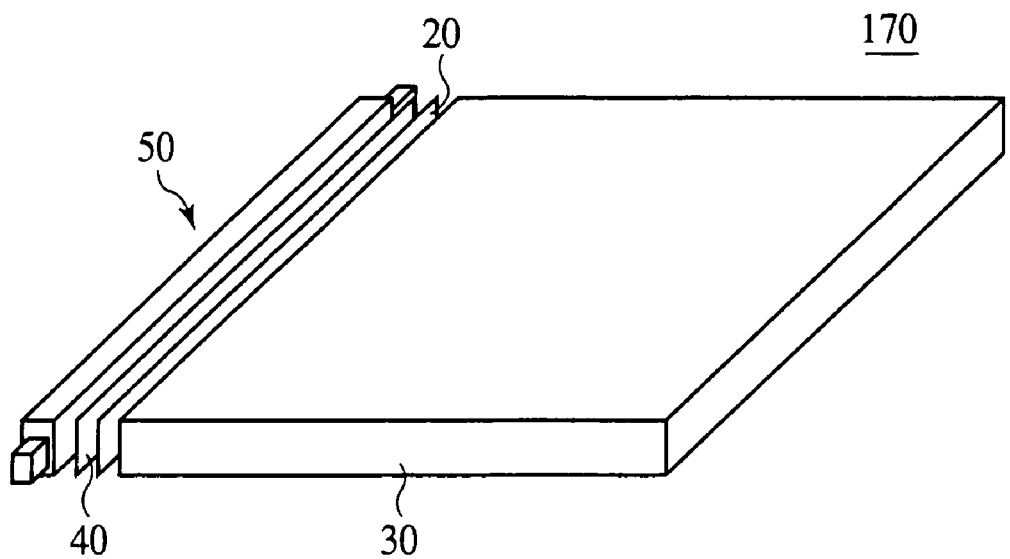
FIG. 7 is a view of a sixth embodiment of the present invention.

FIG. 7 is a view of the lighting device 170 according to a sixth embodiment of the present invention. The lighting device 170 is of the front light-type and is similar to the lighting device 120 according to the second embodiment described above except that a ¼ wavelength sheet 40 as the phase modulation element is disposed between the light source unit 50 and the polarization separation sheet 20. The lighting device 170 according to the present embodiment is similar also to the lighting device according to the fifth embodiment described above except the structure of the light source unit 50. The structure of the light source unit 50 is as described above.

In the present embodiment, as shown in FIG. 17, non-polarized light exiting the pillar-shaped light guide 52 is incident on and passes through the ¼ wavelength sheet 40. That portion of the light, which has been linearly polarized in a prescribed direction by the polarization separation sheet 20 is transmitted by the polarization separation sheet 20, and only that portion of the light, which has been linearly polarized normally to the prescribed direction returns to the pillar-shaped light guide 52 through the ¼ wavelength sheet 40.

Figure 17A:
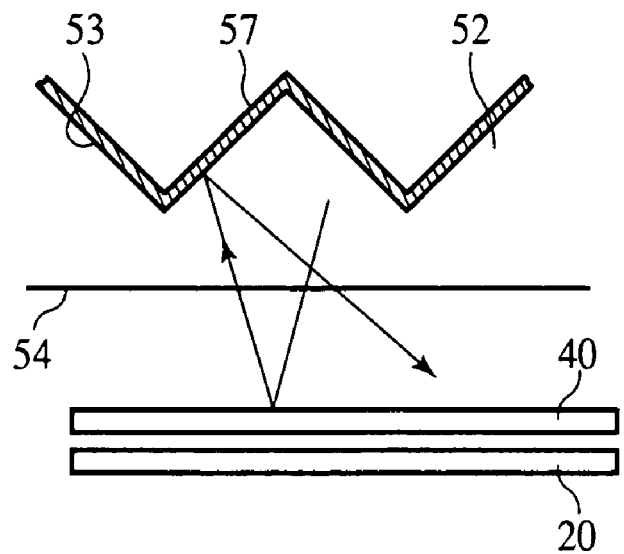
FIG. 17 is views explaining the reflected light on the polarization separation sheet.

The light which arrives back to the pillar shaped light guide 52 has passed through the ¼ wavelength sheet 40 to be circularly polarized light. The circularly polarized light which has returned to the pillar-shaped light guide 52 is incident on the prism surface 53, and, as shown in FIG. 17A, part of the circularly polarized light is reflected on the reflecting layer 57 to be reversed circularly polarized light and again exits at the exiting surface 54.

The reversed circularly polarized light exiting at the exit surface 54 passes through the ¼ wavelength sheet 40 to be linearly polarized light. The polarized direction of this transformed linearly polarized light is normal to the polarized direction of the linearly polarized light which has been reflected on the polarization separation sheet 20 and returned. That is, the transformed linearly polarized light is linearly polarized light which is transmitted by the polarization separation sheet 20. Accordingly, the linearly polarized light transformed by the ¼ wavelength sheet 40 passes through the polarization separation sheet 20 as it is and to the light guide 30.

Figure 17B:
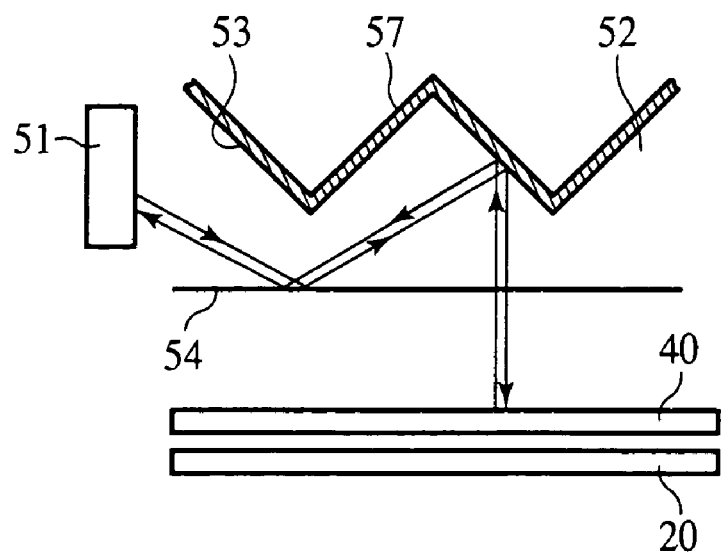

The rest of the circularly polarized light which has returned to the pillar-shaped light guide 52, as shown in FIG. 17B, is reflected on the reflecting layer 57, is totally reflected on the exit surface 54, propagates in the pillar-shaped light guide 52, enters the spot light emitting portions 51 to be transformed into non-polarized light by the secondary emission, propagates through the pillar-shaped light guide 52 to exit again at the exit surface 54, and passes through the ¼ wavelength sheet 40 and enters the polarization separation sheet 20. The polarization separation sheet 20 transmits only the linearly polarized light in the prescribed direction and reflects the linearly polarized light normal to the prescribed direction. This process is repeated.

As described above, in the present embodiment as well as in the fifth embodiment described above, the phase modulation element (the ¼ wavelength sheet 40) is disposed between the light source unit and the polarization separation element (the polarization separation sheet 20). Thus, in the present embodiment as well as the fifth embodiment described above, the linearly polarized light which has been reflected on the polarization separation element and returned can propagate to the light guide plate by returning only once to the light source. The linearly polarized light which has been reflected on the polarization separation element and returned does not have to repeat several times the reflection on and the transmission of the respective elements, and the secondary emission, which lessens losses due to the reflection on and the transmission of the respective elements, and the secondary emission, which leads to higher efficiency of utilizing light.

Accordingly, in comparison with the first and second embodiments described above, etc., the present embodiment can have higher light utilization efficiency, and, in combination with liquid crystal panels, can realize brighter liquid crystal panels.

A SEVENTH EMBODIMENT

Figure 8:
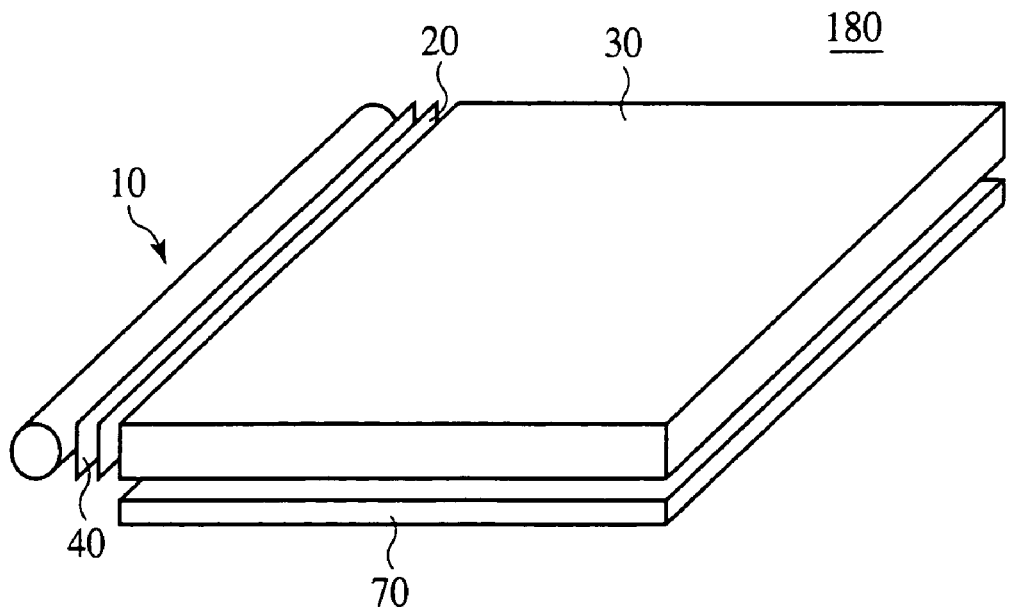
FIG. 8 is a view of a seventh embodiment of the present invention.

FIG. 8 is a view of the liquid crystal display device 180 according to a seventh embodiment of the present invention. The liquid crystal display device 180 is of the reflection-type and has the structure similar to that of the liquid crystal display device 140 according to the third embodiment described above except that the lighting device 160 according to the fifth embodiment is used as the lighting device of the front light-type.

The present embodiment uses as the lighting device the lighting device 160 according to the fifth embodiment, and the liquid crystal display device according to the present embodiment can be brighter than the liquid crystal display device according to the third embodiment.

In the present embodiment, as the lighting device, the lighting device 170 according to the sixth embodiment described above can be used. As in the above-described embodiments, the reflection-type liquid crystal panel 70 can be a TN (Twisted Nematic) mode liquid crystal panel, a VA (Vertically Aligned) mode liquid crystal panel or others, i.e., any of the reflection-type liquid crystal panels of various modes.

AN EIGHTH EMBODIMENT

Figure 9:
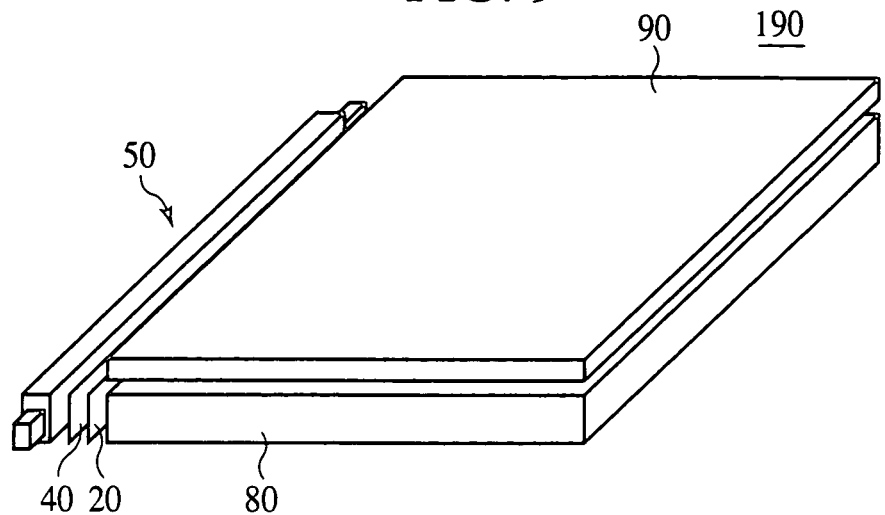
FIG. 9 is a view of an eighth embodiment of the present invention.

FIG. 9 is the liquid crystal display device 190 according to an eighth embodiment of the present invention. The liquid crystal display device 190 is of the transmission-type and has a structure similar to that of the liquid crystal display device 150 according to the fourth embodiment described above except that the lighting device 170 according to the sixth embodiment which is of the back light-type is used as the lighting device of the back light-type.

In the present embodiment, the lighting device 170 according to the sixth embodiment is used as the lighting device, and the liquid crystal display device according to the present embodiment can be brighter than the liquid crystal display device 150 according to the fourth embodiment.

In the present embodiment as well, as the lighting device, the lighting device 160 according to the fifth embodiment described above which is of the back light-type can be used. The transmission-type liquid crystal panel 90 can be any of transmission-type liquid crystal panels of various modes, as can be in the embodiments described above.

A NINTH EMBODIMENT

Figure 10:
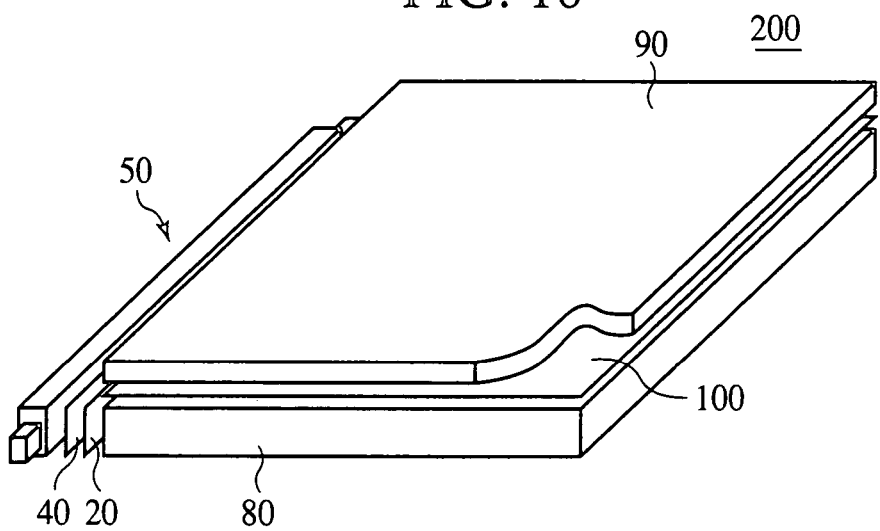
FIG. 10 is a view of a ninth embodiment of the present invention.

FIG. 10 is a view of the liquid crystal display device 200 according to a ninth embodiment of the present invention. The liquid crystal display device 200 is of the transmission-type liquid crystal display device and has a structure similar to that of the liquid crystal display device 190 according to the above-described eighth embodiment except that a ½ wavelength sheet as a second phase modulation element is disposed between the light guide plate 80 and the transmission-type liquid crystal panel 90.

Figure 19A:
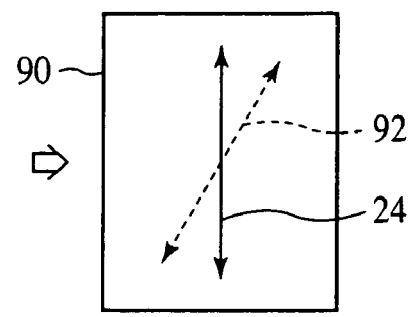
FIG. 19 is views explaining the exit light of the light guide and the transmission axis of the polarizer.

In the liquid crystal display device 200, the direction of the transmission axis of the polarizer disposed on the side of the incidence of the liquid crystal display panel 90 is different from that of the embodiments described above. That is, in the liquid crystal display panel of the embodiments described above, the direction of the transmission axis is in the longitudinal direction of the liquid crystal panel, i.e., in the longitudinal direction of the linear light source unit (the direction indicated by the arrow 24 in FIG. 19A), but in the liquid crystal panel 90 of the present embodiment, the direction of the transmission axis, and the longitudinal direction of the liquid crystal panel, i.e., the longitudinal direction of the linear light source unit 50 form about 45 degree (the direction indicated by the arrow 92 in FIG. 19A). Because liquid crystal panels generally have visual angle dependency, the transmission axes of a pair of polarizers are arranged to intersect each other at a right angle and respectively form a 45 degree angle with respect to the longitudinal direction of the liquid crystal panel.

Figure 19B:
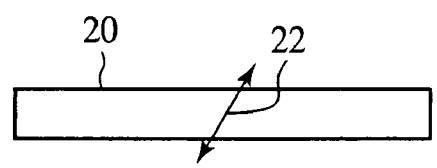

In using such liquid crystal panel 90, as shown in FIG. 19B, the polarized direction of linearly polarized light passing through the polarization separation sheet 20 will be arranged to be the direction indicated by the arrow 22. However, linearly polarized light entering the light guide plate 80 in a polarized direction of any angle propagates in the light guide plate 80 to exit from the light guide plate in the direction (indicated by the arrow 24) which is parallel with the longitudinal direction of the liquid crystal panel 90 (the light source 50) shown in FIG. 19A. Then, the polarized direction is deflected from the direction of the transmission axis (indicated by the arrow 92) of the polarizer on the incidence side of the liquid crystal panel 90.

Figure 19C:
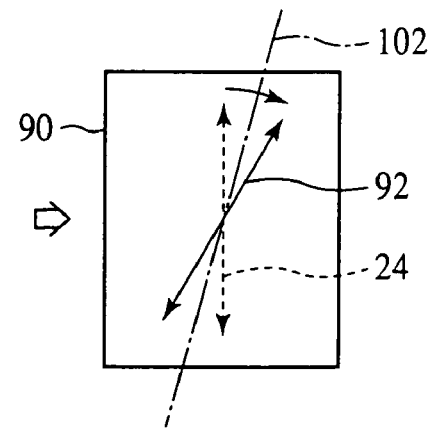

As a countermeasure to this, the liquid crystal display device 200 according to the present embodiment includes the ½ wavelength sheet 100. The ½ wavelength sheet 100 is arranged so that, as shown in FIG. 19C, the direction (indicated by the arrow 102) of the optical axis of the ½ wavelength sheet 100 is intermediate between the polarized direction (indicated by the arrow 24) of the linearly polarized light exiting the light guide plate 80 and the direction (indicated by the arrow 92) of the transmission axis of the polarizer on the incidence side of the liquid crystal panel 90. This arrangement turns the polarized direction of the linearly polarized light exiting the light guide plate 80 into agreement with the direction of the transmission axis of the polarizer on the incidence side of the liquid crystal panel 90 and enters the liquid crystal panel 90 (the polarizer on the incidence side). Accordingly, the linearly polarized light which has exited the light guide plate 80 can enter the liquid crystal panel without loss.

As described above, in the present embodiment, the polarized direction of the linearly polarized light exiting the lighting device (the light guide plate) is turned by a phase modulation element, such as a ½ wavelength sheet or others, into agreement with the direction of the transmission axis of the polarizer on the incidence side of the liquid crystal panel, whereby absorption loss of the polarizer, etc. can be decreased to thereby utilize the light from the lighting device efficiently without loss. The liquid crystal display device can be bright.

In the present embodiment as well, as the lighting device, the lighting device according to the above-described embodiments which are of the back light-type can be used. As the transmission-type liquid crystal panel, the transmission liquid crystal panel of any of various modes can be used, as can be in the embodiments described above.

A TENTH EMBODIMENT

Figure 11:
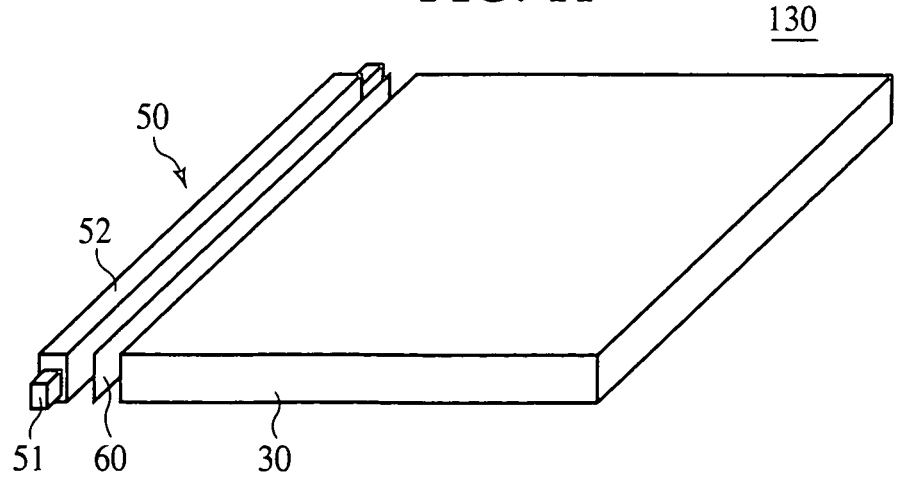
FIG. 11 is a view of a tenth embodiment of the present invention.

FIG. 11 is a view of the lighting device 130 according to a tenth embodiment of the present invention. The lighting device 130 according to the present embodiment has a structure which is similar to that of the lighting device 120 according to the second embodiment described above except that the light source unit 50 of the former is a little different from that of the latter, and a ½ wavelength sheet 60 is disposed in place of the polarization separation sheet 20. That is, as shown in FIG. 15, the light source unit 50 does not include the reflecting layer of the above-described second embodiment on the prism surface 53 of the pillar-shaped light guide 52.

Figure 15A:
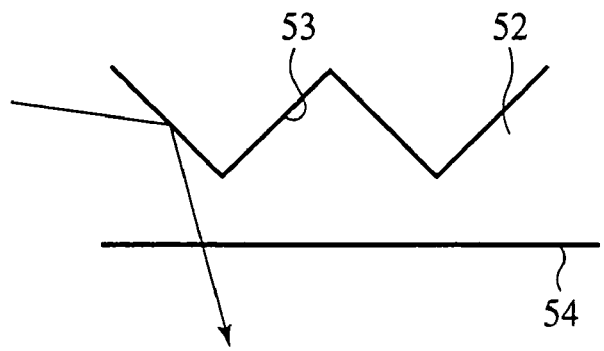
FIG. 15 is views explaining the light in the pillar-shaped light guide.
Figure 15B:
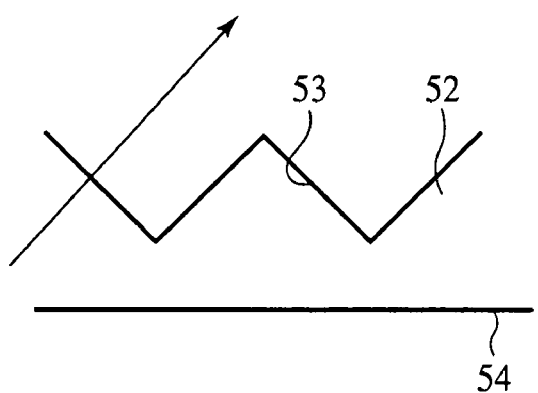
Figure 15C:
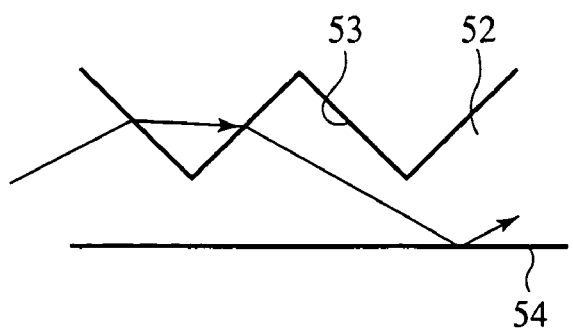

Accordingly, only that portion of light incident on the pillar-shaped light guide 52 from the spot light emitting portions 51, which, as shown in FIG. 15A, is incident on the prism surface 53 under conditions for the total reflection exits at the exit surface 54. Light which, as shown in FIG. 15B, is incident on the prism surface 53 without satisfying the total reflection conditions, and passes through and exits the pillar-shaped light guide 52, or light which, as shown in FIG. 15C, exits once at one prism surface 53 and re-enters the pillar-shaped light guide 52 at another prism surface 53, and propagates through the pillar-shaped light guide 52 to exit at the opposite side does not become light which exits at the exit surface 54 to propagate toward the ½ wavelength sheet 60 but is light that is ineffective.

When light is totally reflected, S-polarized component is often increased under a specific angle condition. In the structure of the present embodiment, the angle of the prism surface 53 is set at a specific angle condition, whereby while light repeats incidence and reflection on the prism surface 53, the light in the pillar-shaped light guide 52 has more S-polarized component. Accordingly, the light exiting the pillar-shaped light guide 52 can be linearly polarized light without the use of the polarization separation element. The flat light guide plate 30, etc., included in the above-described embodiments, is formed to have conditions so that the S-polarized component and the P-polarized component are totally reflected to the same extent.

Accordingly, to linearly polarize the light incident on the light guide plate 30 in a prescribed direction, the ½ wavelength sheet 60 alone may be used. Linearly polarized light which has been turned in a required polarized direction by the ½ wavelength sheet 60 is incident on the light guide plate 30 and exits the light guide plate 30 with the polarized state retained.

Accordingly, the lighting device 130 according to the present embodiment is used as the lighting device of the liquid crystal display device 200 according to the present embodiment, whereby the ½ wavelength sheet 60 of the lighting device 130 can function also as the ½ wavelength sheet 100 of the liquid crystal display device 200. The ½ wavelength sheet 100 can be accordingly omitted. Thus, the use of the lighting device 130 according to the present embodiment can realize bright liquid crystal display devices with smaller numbers of members.

(Optical Element)

FIG. 20 is views of examples of structures of the respective optical elements, the polarization separation sheet 20, the ¼ wavelength sheet 40 and the ½ wavelength sheet 100 used in the above-described embodiments.

Figure 20A:
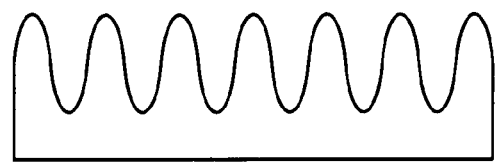
FIG. 20 is views of examples of the structure of the optical elements.

FIG. 20A shows an element having the surface formed in concavities and convexities. The modulation period of the concavities and convexities is made small, whereby the element can have the same function as the wavelength sheet.

Figure 20B:

FIG. 20B shows the so-called volume-type element, whose refractive index in the medium is periodically changed. The modulation period of the refractive index in the medium is made small, whereby the sheet having the same function as the wavelength sheets can be formed. As shown in FIG. 20B, the element has a refractive index period substantially in parallel with the substrate surface, whereby the element can have the same function as the polarization separation sheet.

The present invention has been described above. However, the present invention is not limited to the embodiments described above and can cover other various modifications.

INDUSTRIAL APPLICABILITY

The present invention is applicable to lighting devices for applying light to liquid crystal panels, and liquid crystal display devices using the lighting devices. The present invention is useful for lighting devices which can be fabricated at low cost and can increase the efficiency of utilizing light source emission thereof with a smaller number of members, and furthermore can increase the luminance of liquid crystal display devices, and liquid crystal display devices using the lighting device.

The invention claimed is:

1. A lighting device comprising:
   a light guide plate in the shape of a flat plate;
   a light source unit disposed on the side of the light guide plate;
   a polarization separation element disposed between the light guide plate and the light source unit, for transmitting linearly polarized light in a first polarized direction and reflecting linearly polarized light in a polarized direction normal to the first polarized direction; and
   a phase modulation element disposed between the light source unit and the polarization separation element,
   the light source unit including a pillar-shaped light guide which light exits at a first side surface, a spot light emission source disposed on the end surface of the pillar-shaped light guide, and a reflecting layer disposed on a second side surface of a prism surface opposed to the first side surface for reflecting light from the spot light emission source, where said reflecting layer is shaped to correspond to said prism surface and is comprised of one of a metal film or a multi-layer film.

2. A lighting device comprising:
   a light guide plate in the shape of a flat plate;
   a light source unit disposed on the side of the light guide plate, said light source unit including a prism surface for emitting linearly polarized light from said light source unit without the use of a polarization separation element; and
   a phase modulation element disposed between the light guide plate and the light source unit.

3. A lighting device according to claim 2, wherein
   the light source unit includes a spot light emission source and a pillar-shaped light guide, where said pillar-shaped light guide includes said prism surface, and
   the spot light emission source is disposed on the end surface of the pillar-shaped light guide, and light exits the pillar-shaped light guide at a first side surface.

4. A lighting device according to claim 3, wherein a second side surface opposed to the first side surface is said prism surface.

5. A liquid crystal display device comprising:
   a liquid crystal panel;
   a lighting device including a light guide plate in the shape of a flat plate, a light source unit disposed on the side of the light guide plate, and a polarization separation element disposed between the light guide plate and the light source unit, for transmitting linearly polarized light in a first polarized direction and reflecting linearly polarized light in a polarized direction normal to the first polarized direction; and
   a first phase modulation element disposed between the light source unit and the polarization separation element,
   the light source unit including a pillar-shaped light guide which light exits at a first side surface, a spot light emission source disposed on the end surface of the pillar-shaped light guide, and a reflecting layer disposed on a second side surface of a prism surface opposed to the first side surface for reflecting light from the spot light emission source, where said reflecting layer is shaped to correspond to said prism surface and is comprised of one of a metal film or a multi-layer film.

6. A liquid crystal display device according to claim 5, comprising a second phase modulation element disposed between the liquid crystal panel and the lighting device.

7. A liquid crystal display device comprising:
   a liquid crystal panel;
   a lighting device including a light guide plate in the shape of a flat plate;
   a light source unit disposed on the side of the light guide plate, said light source unit including a prism surface for emitting linearly polarized light from said light source unit without the use of a polarization separation element; and
   a phase modulation element disposed between the light guide plate and the light source unit.

8. A liquid crystal display device according to claim 7, wherein
   the light source unit includes a spot light emission source and a pillar-shaped light guide, where said pillar-shaped light guide includes said prism surface, and
   the spot light emission source is disposed on the end surface of the pillar-shaped light guide, and light exits the pillar-shaped light guide at a first side surface.

9. A liquid crystal display device according to claim 8, wherein a second side surce opposed to the first side surface is said prism surface.

* * * * *

UNITED STATES PATENT AND TRADEMARK OFFICE
CERTIFICATE OF CORRECTION

PATENT NO. : 7,021,812 B2 Page 1 of 1
APPLICATION NO. : 10/733052
DATED : April 4, 2006
INVENTOR(S) : Satoshi Maeda et al.

It is certified that error appears in the above-identified patent and that said Letters Patent is hereby corrected as shown below:

Col. 16, line 53, delete "surce" and insert --surface--.

Signed and Sealed this

Twenty-fifth Day of July, 2006

JON W. DUDAS
*Director of the United States Patent and Trademark Office*